Sept. 29, 1953   C. E. CHRISTOPHERSEN ET AL   2,653,836
REINFORCED V BAND CLAMP
Filed Sept. 4, 1948
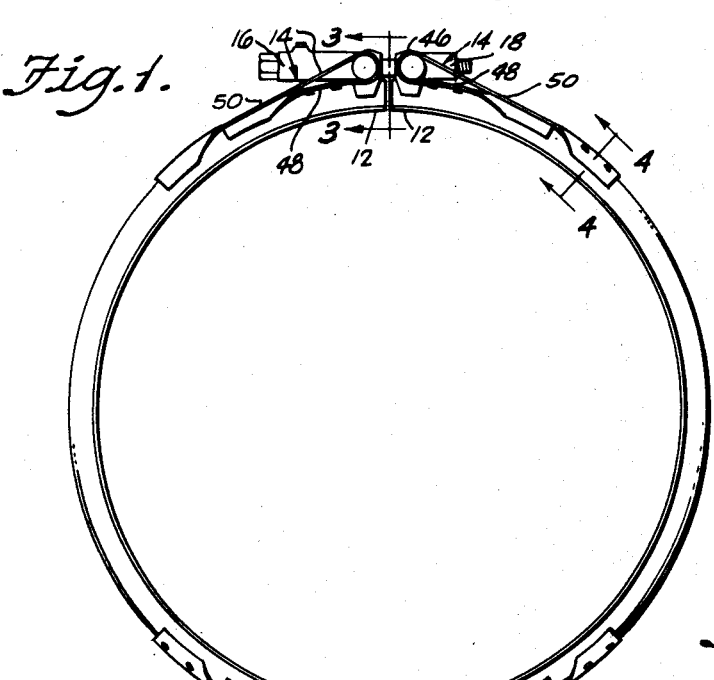
Fig. 1.
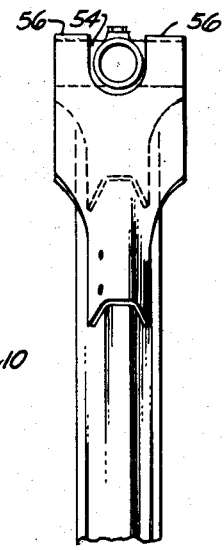
Fig. 2.
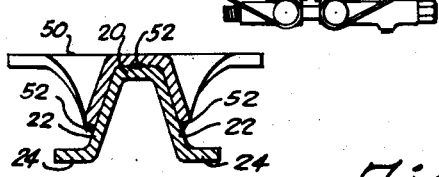
Fig. 4.
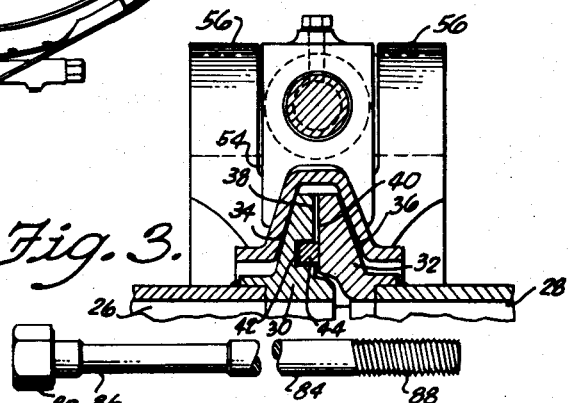
Fig. 3.
Fig. 5.
Fig. 7.
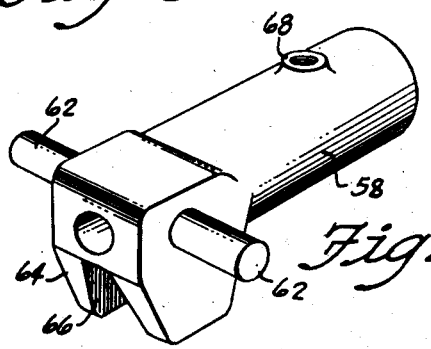
Fig. 8.
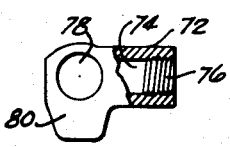
Fig. 6.
INVENTOR.
CLARENCE E. CHRISTOPHERSEN
BY & GEORGE A. MAHOFF
Edwin Coates
ATTORNEY.

Patented Sept. 29, 1953

2,653,836

UNITED STATES PATENT OFFICE 2,653,836

REINFORCED V-BAND CLAMP

Clarence E. Christophersen, Inglewood, and George A. Mahoff, Santa Monica, Calif., assignors to Marman Products Company, Inc., Inglewood, Calif.

Application September 4, 1948, Serial No. 47,786

7 Claims. (Cl. 285—129)

This invention relates to a band clamp and more particularly to a clamp adapted to encircle and grip a pair of tubular or cylindrical members in such manner as to force them axially into engagement with each other. One such use, for example, is in clamping adjacent ends of a pair of pipes and forcing them into end abutting relation with each other to produce a fluid tight joint for conducting ventilating air, liquids, or gases such as the exhaust gases of a jet type engine.

Clamps for these general purposes are already known and they range from extremely simple varieties to those which are highly complicated and relatively costly. One of the simpler types which is fairly satisfactory for light duty comprises a generally channel shaped strip formed into a circle with perforated ears at or near the ends of the strip for the reception of a clamping bolt, the walls of the channel being adapted to engage annular shoulders on pipe ends to hold them in abutting relation. In order to provide a tight joint, both the shoulders and the flanges of the channel are sloped or angled so that radial compressive forces developed by tightening of the band will produce axial or longitudinal force components to urge the pipes into tight endwise engagement.

The reactions to these longitudinal forces tend to urge the flanges of the band outwardly, or flatten it. Such flattening thruout most of the intermediate length of the band is effectively prevented by the circumferential tension set up by the clamping bolt but the free ends of the band are not so restrained and therefore tend to flatten out. This flattening reduces the axial clamping force near the ends of the band with a consequent decrease in the effectiveness of the joint.

The present invention overcomes this defect in prior art clamps by providing a simple and economical means for reinforcing the ends of the bands to prevent axial spreading or deformation. As disclosed in the accompanying drawing, this reinforcement is accomplished with a minimum of additional material and weight and without adding any complication over the simpler type of clamp which it replaces.

The invention consists generally in providing a trunnion on each band end for the reception of a clamping bolt, one trunnion having a smooth bore for the free passage of the bolt and the other trunnion having a bore axially aligned with the first bore and being threaded thruout at least part of its length for engagement with the threaded end of the bolt. Each of the trunnions is provided with an integral boss or extension directed radially inward from its inner surface, each extension being centrally recessed or cut away to provide a channel form preferably of the same shape as the surface of the band end.

When the trunnions are drawn together by the clamping bolt they are urged radially inwardly into contact with the band ends, the extensions embracing the band and reinforcing it against axial spreading. The anchorages or saddles which carry the trunnions are permanently secured to the band at circumferentially spaced locations thereon and are so shaped and attached as to provide reinforcement at the points of attachment. In cases where the band is so strong and stiff that it is difficult to spread it sufficiently to slip it over the pipe ends to be secured, the band may be made in two sections, duplicating the trunnions and their mountings at the additional band ends.

Clamps embodying the invention herein disclosed are eminently suitable for installations where very high forces are encountered, such as in the tail pipes of jet engines for aircraft. Tests have shown that these clamps are capable of resisting axial forces in excess of 20,000 pounds tending to separate the joined pipe sections.

The presently preferred form of the invention is illustrated in the accompanying drawing in which:

Figure 1 is a side elevational view of the clamp illustrating the relative arrangement of parts;

Figure 2 is an elevational view of the upper part of the clamp of Figure 1 taken from the right;

Figure 3 is a sectional view taken on line 3—3 of Figure 1, and also including a typical pair of pipe ends held in engagement by the clamp;

Figure 4 is a sectional view taken on line 4—4 of Figure 1;

Figure 5 is a side elevational view of the upper left hand trunnion of Figure 1 with a portion broken away;

Figure 6 is a side elevational view of the upper right hand trunnion of Figure 1 with a portion broken away;

Figure 7 is a side elevational view of the clamping bolt; and

Figure 8 is a perspective view of the trunnion of Figure 5.

The general configuration of the clamp is illustrated in Figure 1, in which the channel shaped band is generally indicated by the reference numeral 10. While the band is here shown as divided into two pieces, a one-piece band may be used in lighter constructions. In the form shown, the band is provided at each free end 12 with anchorages or saddles 14 to receive trunnions 16 and 18. As seen in Figures 3 and 4, the band is generally channel shaped and includes a web portion 20 and a pair of diverging wall portions 22, 22 making an included angle of approximately forty degrees. The free edges of the flanges are further provided with laterally extending reinforcing portions 24, 24, which latter may be omitted in the case of light duty clamps.

As an illustration of the manner of use of the clamp, a pair of pipe ends 26, 28 is shown in Figure 3, said pipe ends being provided with shoulders 30, 32 welded or otherwise secured thereto, said shoulders having sloping walls 34, 36 conforming to the flanges 22 and generally planar end faces 38, 40, an annular groove or channel 42 being provided in end face 38 to receive gasket 44 which compressively engages face 40 to form a fluid tight seal. It will be apparent that circumferential tension in the band will cause radial constriction, and contact of the flanges 22 with sloping walls 34, 36 will produce an axial force on the shoulders 30, 32 resulting in compressive engagement of faces 38, 40 and consequent fluid tight sealing of the joint.

The circumferential tension existing in the intermediate portion of the band will prevent the flanges 22 from spreading more than a negligible amount but, as the free ends 12 are approached, this force becomes less and less and the extreme ends, in the absence of the present invention, will tend to spread out in response to the axial forces exerted thereon. The novel construction hereinafter described prevents such spreading.

The anchorages or saddles 14 are identical and each comprises a strap or band member bent back on itself to form a loop 46 with legs 48 and 50 of unequal lengths. These band members are of greater axial width than the annular band 10 and their free ends are bent into a channel formation matching that of the annular band as best seen in Figure 4. The two channel formations are then united by welds 52 so that the band member serves as a doubler and greatly increases the resistance of the annular band to spreading. Since the two ends of the band member are attached at circumferentially spaced points an appreciable portion of the length of the annular band is reinforced by this construction.

The looped portion 46 of each band member is centrally apertured or cut away at 54, as can be seen in Figures 2 and 3, to provide clearance for trunnions 16 and 18 and to provide laterally spaced bearings 56 to pivotally support the trunnions.

The trunnion 16, illustrated in detail in Figures 5 and 8 is preferably forged from high strength material and includes a cylindrical body portion 58 having a smooth axial bore 60 therethru for reception of the clamping bolt. The rightward end, as viewed in Figure 5, is provided with a pair of laterally oppositely directed cylindrical bosses or lugs 62 which are adapted to be journaled in the saddle bearings 56. A downwardly directed extension 64 is centrally cut away or channeled at 66 with diverging side walls to match the end 12 of band 10. An apertured and threaded boss 68 is formed on the cylindrical portion 58 to receive a small headed screw 70 which extends slightly into bore 60 to form a removable abutment or stop.

The trunnion 18 is generally similar to trunnion 16 but is somewhat shorter. It includes a cylindrical body portion 72 having a bore 74 therein which is threaded thruout part of its length as indicated at 76. The leftward end, as viewed in Figure 6 is provided with laterally oppositely extending cylindrical bosses or lugs 78 and the downward extension 80 is channeled in the same way as trunnion 16.

These trunnions are assembled as shown in Figure 1 with their bosses 62 and 78 journaled in saddle bearings 56 and with their bores 60 and 74 in axial alignment.

The clamping bolt, illustrated in Figure 7, includes a head 82 and a shank 84 having a diameter just slightly less than that of bore 60, the shank being undercut at 86 for a portion of its length near the head end and being threaded at its free end 88.

The bolt is inserted first thru trunnion 16 and then into trunnion 18, its end 88 being threaded into portion 76 of the latter. The abutment screw 70 is then inserted and its lower end projects into the annular space between the bore 60 and the undercut or recessed portion 86 of the bolt, serving as an abutment to prevent inadvertent removal of the bolt from trunnion 16.

When the bolt is pulled up tight it draws the trunnions toward each other and tightens the annular band on the shoulders 30 and 32 to complete the joint. The circumferential tension brings the extensions 64 and 80 down into contact with the ends 12 of the annular band, this movement being facilitated by the pivotal mounting at 56 and also by the fact that the saddle members are made of resilient material. When the extensions are firmly in contact with the ends 12, as in Figure 3, they constitute extremely rugged reinforcements to prevent axial spreading of said ends.

It will be seen that the invention described above provides a very simple clamp which is particularly well adapted for use in installations requiring unusually high strength, and that these ends are attained with a minimum of material and weight.

While we have shown the presently preferred embodiment of the invention in the accompanying drawing it will be obvious to those skilled in the art that various modifications may be made without departing from its spirit or scope and it is intended that all such modifications shall be embraced within the scope of the following claims.

We claim:

1. A clamp comprising: a generally annular band having the form of an inwardly opening channel with diverging side walls terminating in cylindrical, axially directed stiffening flanges; said band having at least two end portions facing each other in circumferentially spaced relation; an anchorage on each end portion comprising a reversely looped band member having its free ends secured to said annular band and its looped end adjacent to said end portion; the central portion of each looped end being cut away; a trunnion mounted in each said cut-away portion and provided with bosses journaled in the looped portions of said band member; an inward extension integral with each trunnion having an inwardly open channel formation generally corresponding to the shape of said annular band to embrace and reinforce said band against axial divergence; and securing means passing thru said trunnions to draw them together to contract said band into engagement with an article to be clamped and to draw said trunnion extensions into reinforcing pressure against the end portions of said side walls of the band, whereby the greater the tensioning of the band the greater the reinforcement pressure against the side walls of the band.

2. A clamp as claimed in claim 1 in which one of said trunnions is internally threaded and said securing means is a bolt passing freely thru an aperture in the other of said trunnions into threaded engagement with said first trunnion.

3. A clamp as claimed in claim 1 in which the free ends of said looped members are channel shaped to conform to the shape of said annular band and are secured thereto in reinforcing relation therewith.

4. A clamp as claimed in claim 1 in which the free ends of said looped members are channel shaped to conform to the shape of said annular band and are secured thereto at circumferentially spaced locations to reinforce said band against axial divergence.

5. A clamp comprising: a generally annular band having the form of an inwardly opening channel with diverging side walls; said band having at least two end portions facing each other in circumferentially spaced relation; a saddle on each end portion comprising a looped band member having a central aperture; a trunnion mounted in each aperture and having bosses journaled in said saddle; an inward extension on each trunnion having an inwardly opening channel formation to embrace and reinforce the end portion of said annular band; axially aligned openings in said trunnions; and bolt means passing thru said openings to draw said trunnions together to contract said band into engagement with an article to be clamped and to draw said trunnion extensions into reinforcing pressure against the end portions of said side walls of the band, whereby the greater the tensioning of the band the greater the reinforcement pressure against the side walls of the band.

6. A clamp as claimed in claim 5; said saddles being formed of resilient material to facilitate movement of said trunnion extensions into contact with the end portions of said annular band.

7. A clamp as claimed in claim 5; the opening in one of said trunnions being threaded; said bolt means passing freely thru the opening in the second trunnion into threaded engagement with said first trunnion; and means carried by said second trunnion to prevent complete withdrawal of said bolt means therefrom.

CLARENCE E. CHRISTOPHERSEN.
GEORGE A. MAHOFF.

References Cited in the file of this patent

UNITED STATES PATENTS

| Number | Name | Date |
| --- | --- | --- |
| 815,558 | Rosier | Mar. 20, 1906 |
| 1,093,868 | Leighty | Apr. 21, 1914 |
| 1,185,487 | Eastman | May 30, 1916 |
| 1,431,612 | Wittner | Oct. 10, 1922 |
| 1,830,782 | Burnish | Nov. 10, 1931 |
| 2,148,577 | Plott | Feb. 28, 1939 |
| 2,341,828 | Tetzlaff | Feb. 15, 1944 |
| 2,403,449 | Meyer | July 9, 1946 |
| 2,409,576 | Markey | Oct. 15, 1946 |
| 2,426,423 | Woolsey | Aug. 26, 1947 |
| 2,460,984 | Hill | Feb. 8, 1949 |